United States Patent
Zhang

(10) Patent No.: US 6,856,728 B2
(45) Date of Patent: Feb. 15, 2005

(54) LENSED FIBER OPTIC COUPLER

(75) Inventor: Nai Zhang, Fremont, CA (US)

(73) Assignee: Multiplex, Inc., South Plainfield, NJ (US)

( * ) Notice: Subject to any disclaimer, the term of this patent is extended or adjusted under 35 U.S.C. 154(b) by 199 days.

(21) Appl. No.: 10/199,558

(22) Filed: Jul. 19, 2002

(65) Prior Publication Data

US 2004/0013358 A1 Jan. 22, 2004

(51) Int. Cl.[7] .............................. G02B 6/32
(52) U.S. Cl. ...................... 385/33; 385/31; 385/119
(58) Field of Search .............. 385/31–35, 38, 385/119

(56) References Cited

U.S. PATENT DOCUMENTS

| 4,456,330 | A |   | 6/1984  | Blüdaü |
|-----------|---|---|---------|--------|
| 4,665,529 | A |   | 5/1987  | Baer et al. |
| 4,678,268 | A |   | 7/1987  | Russo et al. |
| 4,701,011 | A |   | 10/1987 | Emkey et al. |
| 4,726,645 | A |   | 2/1988  | Yamashita et al. |
| 4,729,621 | A |   | 3/1988  | Edelman |
| 4,737,006 | A |   | 4/1988  | Warbrick |
| 4,755,203 | A |   | 7/1988  | Coutts |
| 4,807,954 | A |   | 2/1989  | Oyamada et al. |
| 4,854,663 | A |   | 8/1989  | Borsuk et al. |
| 4,893,890 | A |   | 1/1990  | Lutes |
| 5,185,836 | A |   | 2/1993  | Baker |
| 5,293,438 | A |   | 3/1994  | Konno et al. |
| 5,500,911 | A |   | 3/1996  | Roff |
| 5,751,870 | A |   | 5/1998  | Forkner et al. |
| 5,772,657 | A | * | 6/1998  | Hmelar et al. ............... 606/15 |
| 6,130,972 | A |   | 10/2000 | Shiraishi et al. |
| 6,263,133 | B1 | * | 7/2001 | Hamm ...................... 385/33 |
| 6,301,406 | B1 |   | 10/2001 | Irie et al. |
| 6,317,550 | B2 |   | 11/2001 | Irie et al. |
| 6,416,234 | B1 | * | 7/2002 | Wach et al. ................. 385/70 |
| 6,529,661 | B2 | * | 3/2003 | Kropp ........................ 385/38 |

FOREIGN PATENT DOCUMENTS

| JP | 53-84738  | 7/1978 |
|----|-----------|--------|
| JP | 2-208608  | 8/1990 |
| JP | 6-208041  | 7/1994 |

* cited by examiner

Primary Examiner—Akm Enayet Ullah
Assistant Examiner—Michelle R. Connelly-Cushwa
(74) Attorney, Agent, or Firm—Testa, Hurwitz & Thibeault, LLP

(57) ABSTRACT

In one aspect, the invention is an optical fiber having a modified geometry. The optical fiber includes an optical fiber portion. The optical fiber portion can have a first fiber end face and a cylindrical fiber surface encircling the first fiber end face. The optical fiber having a modified geometry also includes a contoured surface formed from the first fiber end face. The contoured surface does not extend beyond the cylindrical fiber surface. A reflective coating disposed on the contoured surface and an optical transmission region formed from a portion of the cylindrical fiber surface are also included in the optical fiber having a modified geometry.

20 Claims, 17 Drawing Sheets

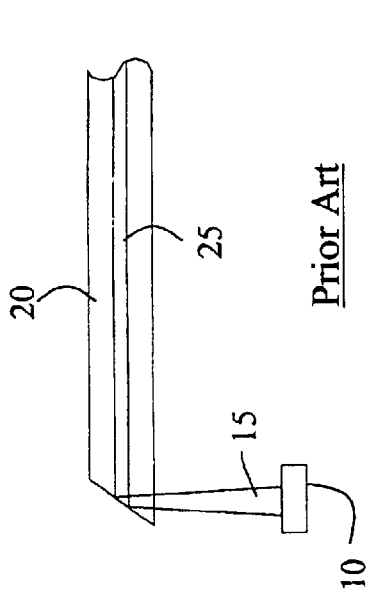
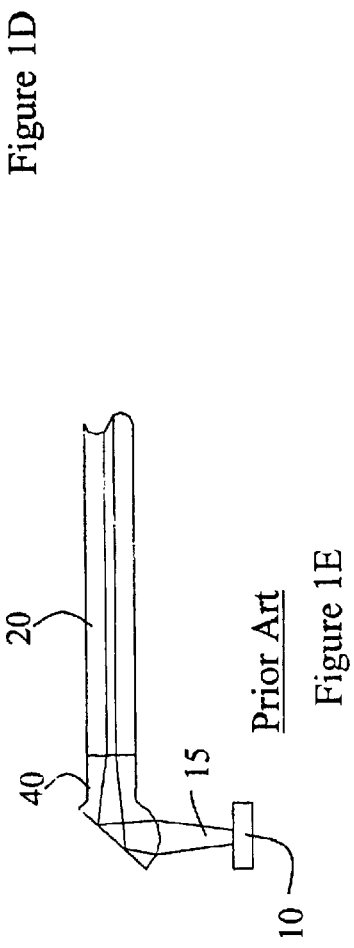
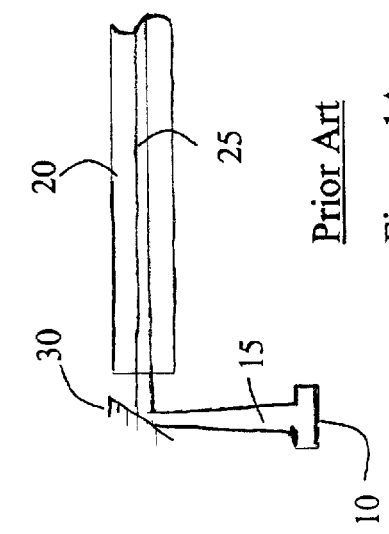
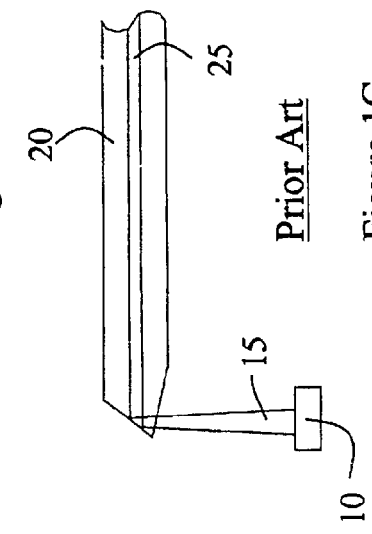

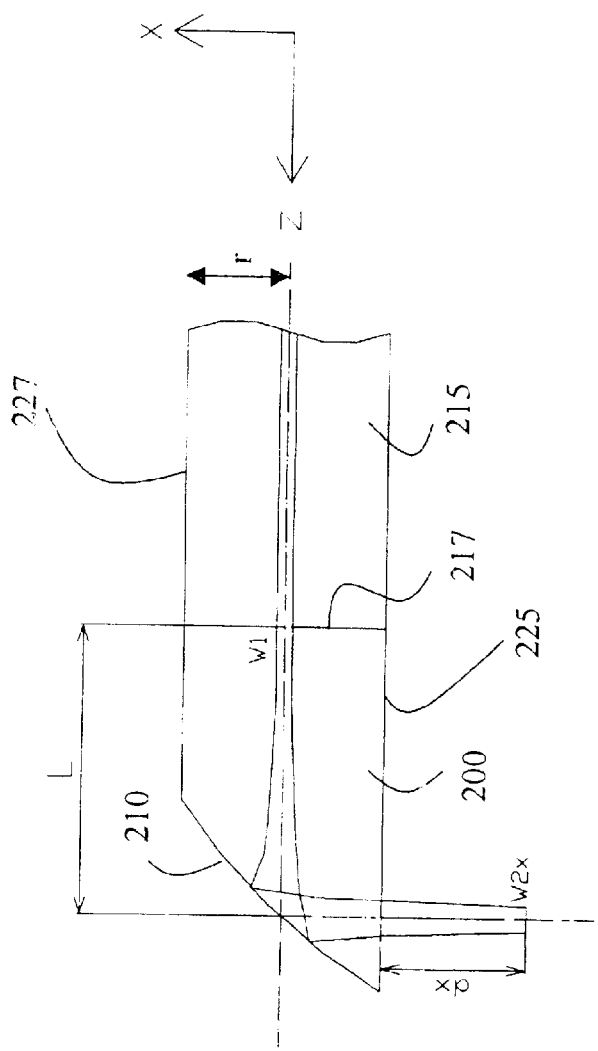
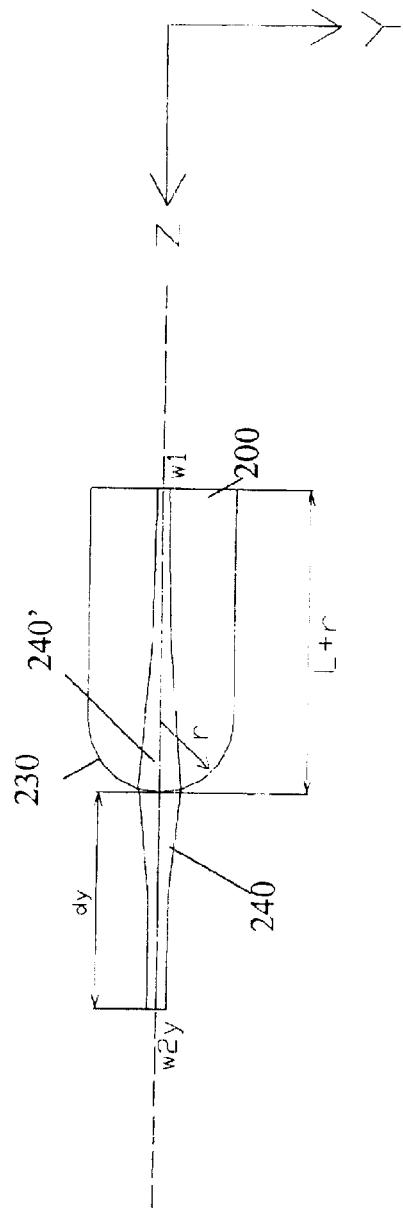
Figure 2D
Figure 2E

Step 1

Step 2

Step 3

Step 4

Step 5

LENSED FIBER OPTIC COUPLER

FIELD OF THE INVENTION

The invention relates generally to the field of fiber optics. In particular, the invention relates to a lensed optical fiber coupler and associated methods of manufacture.

BACKGROUND OF THE INVENTION

Fundamental fiber technologies have developed as the number of applications based upon light transmission through optical fiber has grown over time. In particular, developing techniques and devices for efficiently coupling light from optical sources into optical fibers as well as for coupling light from optical fibers to optical receivers has received considerable attention during this period of growth. The light beam emitted from the optical source, such as a diode laser, typically reaches the optical fiber at varying angles, depending on the light's initial angles of emission. This can result in some light beams failing to reach the fiber core or reaching the fiber core at an angle wider than the acceptance angle. Thus, these beams fail to become harnessed as light that propagates through the optical fiber for use in a given application. In particular, when light from the optical fiber is coupled to the optical receiver, such as a photodetector, if the receiver is not positioned with both its center aligned with the axis of the fiber and its face perpendicular to the fiber axis, the receiver may not capture the beam from the fiber. This inefficient coupling of light from the source to the fiber or from fiber to detector has a negative impact on the optical fiber application. In addition, another source of coupling inefficiency results from the difficulty in creating an optical coupling device with a working distance suitable for precisely focusing the incident light beams upon the fiber core or focusing the light from the fiber to the optical detector. These coupling inefficiencies have a direct impact on fiber optic telecommunications systems. For example, when less light reaches the fiber core, as a result of coupling inefficiencies for example, the signal transmission distance over which the light based signal can travel will be reduced as a result of the initial coupling inefficiency.

Various approaches have been developed to improve the coupling of the light source to the optical fiber or from the optical fiber to the optical receiver. Some of the approaches of the prior art are illustrated in FIGS. 1A–1E. FIG. 1A illustrates the light from an optical fiber 20 being directed to a photodetector 10 by an angled reflector 30. FIGS. 1B and 1C illustrate the light from an optical fiber 20 being directed to a photodetector 10 by the specially shaped fiber. FIG. 1D illustrates a system as shown in FIG. 1A with the addition of a lens 35 to focus the incident light 15 from a light source 10 upon the fiber core 25 at a known working distance or the light from the fiber 20 to the photodetector 10 at a known working distance. FIG. 1E illustrates a system incorporating a lensed optical fiber 40 with a spherical portion for directing the light 15 from a light source incident on the lensed fiber 40 into another optical fiber 20 or suitable for directing the light 15 from the fiber 20 to an optical receiver (not shown).

The devices shown in FIGS. 1A, 1B and 1C have the sole function of redirecting the light from optical fiber 20 along another optical path. In particular, the prior art devices shown operate solely by receiving the light 15 and bending the light 15 by an angle of approximately 90 degrees in order to send the beam in the direction of the photodetector 10. These three devices do not control the beam spot size or focus the beam at a prescribed working distance. Although the device shown in FIG. 1D can function, in principle, to control the beam spot and working distance, it entails troublesome alignment between the semiconductor laser or photodetector, lens, and optical fiber, and requires a coupling system of a substantial size. The lenses used in these devices are often bulky and occupy sufficient space such that the external lens based device cannot be used when coupling between an optical source array and an optical fiber array or an optical fiber array and detector array, in which a plurality of optical sources, or photodetectors, or optical fibers are arranged at short intervals. The device shown in FIG. 1E can also control the beam spot diameter and the working distance to an extent. However, the range of radii for the spherical portion of the lensed fiber is limited. This results in the range of possible spot sizes and working distances being accordingly limited. In addition, the spherical lensed fiber structure is complicated and difficult to make. Furthermore, it is difficult to focus a light spot with a diameter which is close to or less than the mode field diameter of a single mode fiber to an optical receiver or couple a light source with a spot diameter close to or less than the mode field diameter of a single mode fiber to a single mode fiber by using the devices illustrated in FIGS. 1D and 1E.

A need therefore exists for an optical coupling device and fabrication methods which result in an easily manufactured device that mitigates the problems of efficiently directing light from an optical source into an optical fiber or from an optical fiber to an optical receiver.

SUMMARY OF THE INVENTION

In one aspect, the invention is an optical fiber having a modified geometry. The optical fiber includes an optical fiber portion. The optical fiber portion can have a first fiber end face and a cylindrical fiber surface encircling the first fiber end face. Typically the optical fiber portion has a circular cross-section with a radius r. The optical fiber having a modified geometry also includes a contoured surface formed from the first fiber end face. The contoured surface does not extend beyond the cylindrical fiber surface. A reflective coating disposed on the contoured surface and an optical transmission region formed from a portion of the cylindrical fiber surface are also included in the optical fiber having a modified geometry. The contoured surface is a portion of a cylindrical solid in various embodiments. In some embodiments, the optical fiber portion is a coreless optical fiber. The contoured surface and the optical fiber portion form at least one substantially cylindrical lens in various embodiments. In various embodiments, the contoured surface is a portion of a cylindrical solid. The contoured surface can be defined by a cylindrical radius R and a fiber length L. The optical coating is a substantially reflective coating in various embodiments. The substantially reflective coating can be a metallic film such as a gold film.

In another aspect, the invention includes a lensed optical fiber coupler. The lensed optical coupler includes an optical fiber which has at least one fiber end face and a cylindrical fiber surface encircling the at least one fiber end face. In addition, the lensed optical coupler includes an optical transmission region formed from a portion of the cylindrical fiber surface. This optical transmission region is typically a portion of a cylinder. A curved reflective surface formed from the fiber end face is also part of the lensed optical fiber coupler. The curved reflective surface focuses light towards a point along a transmission axis intersecting the curved reflective surface. In some embodiments, this focusing occurs at working distance located from the reflecting fiber end face. In one embodiment, the transmission axis substantially coincides with the longitundial axis of the optical fiber. In another embodiment, the transmission axis intersects the optical transmission region, and the transmission axis is substantially perpendicular to the longitudinal axis of the optical fiber. In some embodiments, the curved reflective surface is a portion of a cylinder. Suitable cylinders can have cross-sections which are substantially parabolic, elliptical, circular or other suitable shapes in various embodiments.

In still another aspect, the invention includes a lensed optical fiber coupler. The lensed optical fiber coupler includes a cylindrical optical fiber, having a circular cross-section, a longitudinal z-axis, and a cylindrical fiber surface, such that the circular cross-section is orthogonal to the longitudinal z-axis thereby defining a portion of a y-x plane. The lensed optical fiber coupler further includes a contoured surface, such that a cross-section of the contoured surface observed in a z-x plane is a substantially cylindrical portion. The optical fiber coupler also includes a reflective coating disposed upon the contoured surface and an optical transmission region formed from a portion of the cylindrical fiber surface. In some embodiments, a portion of the contoured surface forms at least one substantially cylindrical lens. In some embodiments, the optical transmission region forms at least one substantially cylindrical lens.

In another aspect, the invention includes a fiber system. The fiber system includes a transmission fiber with a transmission fiber core, a coupling fiber, an optical transmission region, and a curved reflective surface. The coupling fiber includes an optical fiber, having at least one fiber end face and a cylindrical fiber surface encircling the at least one fiber end face. The optical transmission region is formed from a portion of the cylindrical fiber surface and is a portion of a cylinder. The curved reflective surface is formed from the at least one fiber end face. The curved reflective surface focuses light towards a point along a transmission axis intersecting the curved reflective surface. In some embodiments, this focusing occurs at working distance located from the reflecting fiber end face. In one embodiment, the transmission axis substantially coincides with the longitundial axis of the optical fiber. In another embodiment, the transmission axis intersects the optical transmission region, and the transmission axis is substantially perpendicular to the longitudinal axis of the optical fiber. In some embodiments, the curved reflective surface is a portion of a cylinder, wherein the cylinder has a circular cross-section.

In another aspect, the invention includes a method of fabricating a lensed fiber. This method of fabrication includes the steps of providing an optical fiber portion with at least one fiber end face; removing a portion of the at least one fiber end face so that at least one fiber end face is inclined at an angle with respect to an axis passing through the center of the coreless optical fiber; polishing the optical fiber end face in order to form a contoured surface; and applying a reflective coating to the contoured surface. In some embodiments, the optical fiber is a coreless optical fiber. In some embodiments, the contoured surface forms part of a cylindrical lens. In some embodiments, the contoured surface is defined by a cylindrical radius R and a fiber length L. In some embodiments, the angle is substantially 45 degrees.

BRIEF DESCRIPTION OF THE DRAWINGS

The invention is pointed out with particularity in the appended claims. The advantages of the invention described above, together with further advantages, may be better understood by referring to the following description taken in conjunction with the accompanying drawings. In the drawings, like reference characters generally refer to the same parts throughout the different views. The drawings are not necessarily to scale, emphasis instead generally being placed upon illustrating the principles of the invention.

FIGS. 1A–1C are schematic cross-sectional views of prior art devices used to direct light from an optical fiber to a photodetector;

FIGS. 1D and 1E are schematic cross-sectional views of prior art devices used to direct light from an optical source to an optical fiber or from an optical fiber to a photo detector according to the prior art;

FIGS. 2A–2I are schematic cross-sectional views of a lensed optical coupler according to an illustrative embodiment of the invention;

FIGS. 6A–6E are graphs illustrating various properties of an illustrative embodiment of the invention simulated using a 1310 nm wavelength light.

DESCRIPTION OF THE PREFERRED EMBODIMENTS

Embodiments of the present invention are described below. It is, however, expressly noted that the present invention is not limited to these embodiments, but rather the intention is that modifications that are apparent to the person skilled in the art and equivalents thereof are also included.

Figure 2A:
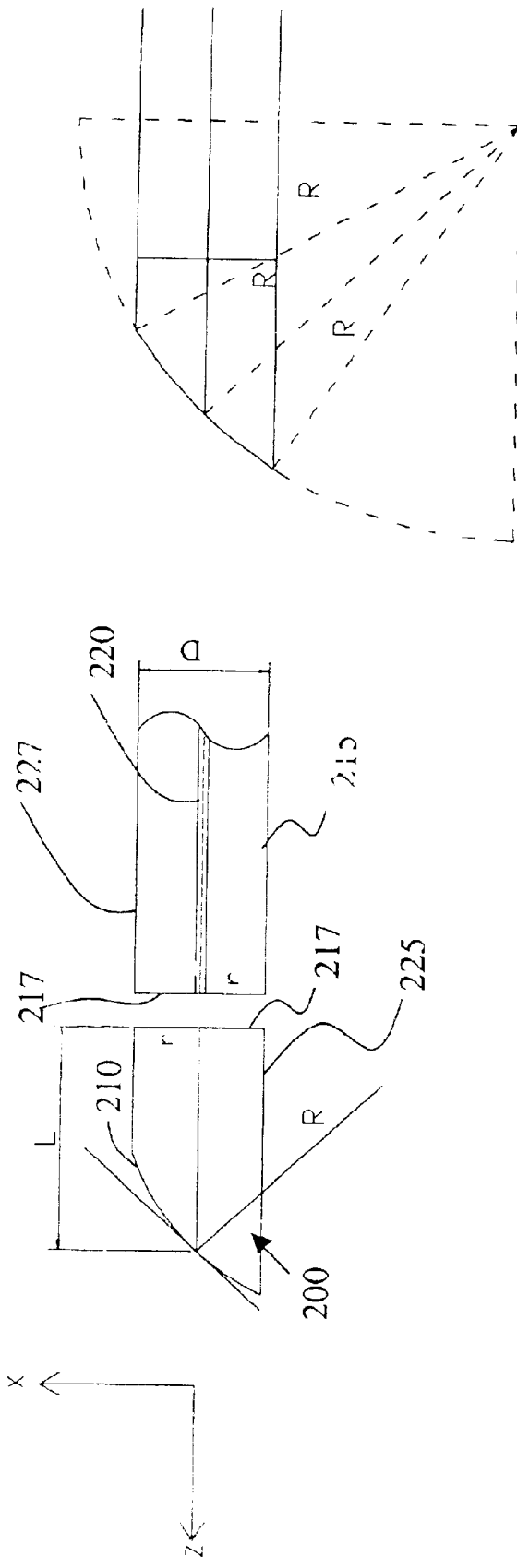

Referring to FIGS. 2A–2E, various schematic cross-sectional views are shown illustrating components of a lensed fiber optical coupler constructed in accordance with this invention. FIG. 2A is an X-Z plan view illustrating a cross sectional view of a lensed fiber 200. The lensed fiber 200 has a contoured surface 210. In various embodiments, a reflective coating is disposed upon the contoured surface 210 of the lensed fiber 200. Various metallic films, such as gold based films for example, are suitable reflective coatings for use in the invention. The reflective coating can also be selected from various dielectric reflective coatings. These dielectric reflective coatings can include multiple layers of dielectric material. For example alternative layers of $TiO_2$ and $SiO_2$ can be used to fabricate suitable reflective coatings in some embodiments. Once the contoured surface 210 has been coated it acts as a curved reflective surface. A transmission fiber 215 is shown in close proximity to the lensed fiber 200. In various embodiments, the lensed fiber 200 and the transmission fiber 215 are joined at a contact boundary surface 217. The lensed fiber and the transmission fiber typically have the same circular cross-section. The circular cross-section has a given radius r. The transmission fiber 215 has a fiber core 220 and a diameter D such that D=2r. The cylindrical surface 225 of the lensed fiber is co-extensive with the transmission fiber cylindrical surface 227. The region where light enters or exits the cylindrical surface 225 of the lensed fiber 200 is the optical transmission region. In this illustrative embodiment, the central longitudinal axis of the lensed fiber 200 and the transmission fiber 215 has been designated as a z-axis in a three-dimensional coordinate system. The longitudinal axis of the lensed fiber or transmission fiber can serve as a transmission axis when light passes through the center of either fiber in some embodiments. This designation is arbitrary and used simply as a convenient reference designation for relating the orientations of the various x-y, y-z, and z-x views illustrated in FIGS. 2A–2F.

Without being bound to any particular theory or mechanism, it is believed that the contoured surface 210 and the associated reflective coating acts as both a reflector and a first cylindrical lens. Another portion of the cylindrical surface of the lensed fiber 200 itself, where light enters or exists, acts as a second cylindrical lens. The reflector, first cylindrical lens, and second cylindrical lens serve as the optical train for transmitting light between an optical source or an optical receiver and a transmission fiber 215. In other embodiments, the lensed fiber can have a contoured surface 210 at either end face for receiving or transmitting light in various directions.

The lensed fiber 200 in this illustrative embodiment is shown with the contoured surface 210 defined, in part, by a cylindrical radius R. The three-dimensional contoured surface is defined in terms of a portion of a surface of a cylindrical solid. The cross-section of the contoured surface 210 illustrated in FIG. 2A is shown as a quarter of a circle with a cylindrical radius R. The cylindrical solid from which a portion is used to generate the contoured surface 210 can be an ellipsoidal, parabolic, circular or other geometrically suitable cylindrical solid. When viewed along the longitudinal z-axis passing though the center of the lensed fiber 200, the contoured surface appears as the surface of a portion of a cylindrical solid in various embodiments. The contoured surface 210 does not extend beyond the cross-sectional radius, r, of the lensed fiber 200. That is the contoured surface does not extend as a bulb beyond the confines of the fiber surface. The geometry of the contoured surface 210 can be chosen to select a given working distance based on the cross-sectional shape of the surface and the individual parameters which define various suitable cross-sectional shapes.

Figure 2B:
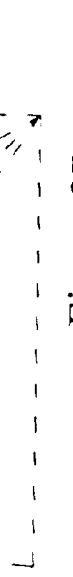

The cross-sectional view of the contoured surface 210 that derives its shape from a portion of a circular cylindrical solid is shown in greater detail in FIG. 2B. Referring to FIG. 2B, three radii of cylindrical radius R are shown intersecting the contoured surface 210 at the topmost and bottommost portions of the cylindrical fiber surface 225 and at the point the longitudinal axis of the lensed fiber 200 intersects the contoured surface 210. The dotted lines represent a sector of a circle of radius R that is a cross-section of quarter of a circular cylindrical solid. The longitudinal axis of the quarter cylinder defined by the dotted lines is normal to the plane of the drawing in FIG. 2B. One lensed fiber end face serves as the contact surface 217 at which a transmission fiber 215 is joined to the lensed fiber 200. This lensed fiber 200 contoured surface 210 geometry allows an optical fiber to serve as an optical coupler with a selectable working distance. The selection of the working distance is determined during the manufacture of the fiber. This is achieved by light entering through a portion of the lensed fiber's cylindrical surface 225 and being directed to the core of the transmission fiber 215 by a reflective coating applied to the contoured surface 210 which directs the light beam. The index of the refraction of the lensed fiber is the same as the core of the single mode fiber in various embodiments. Thus, there is no substantial reflection in the interface between the lensed fiber 200 and the optical transmission fiber 215. In various embodiments the lensed fiber is a coreless fiber. The transmission mode fiber is typically a substantially single mode fiber.

Figure 2C:
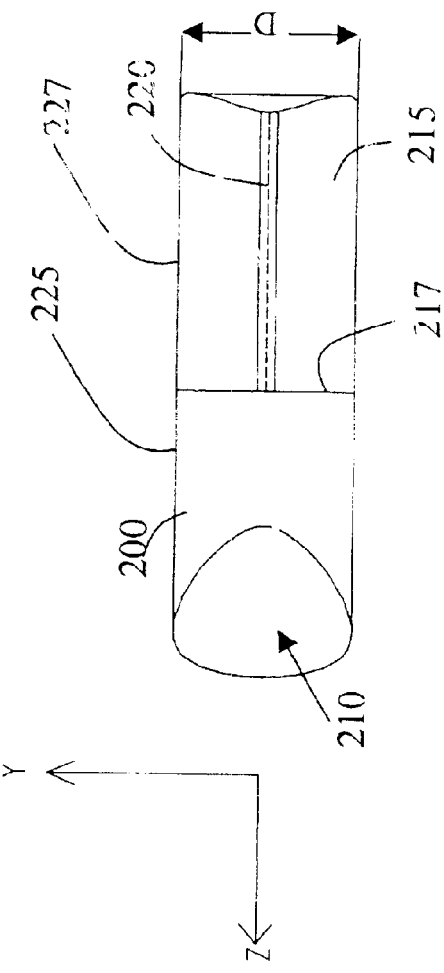

FIG. 2C, shows a Y-Z plan view of the lensed fiber 200 joined to a transmission fiber 215 at the contact boundary surface 217 according to one illustrative embodiment. The contoured surface 210 is shown as a portion of a cylindrical solid. A substantially reflective coating is applied to the contoured surface 210. This allows light from an optical source (not shown) to enter the portion of the lensed fiber surface 225 located substantially adjacent to the contoured surface 210. Once this light enters the lensed fiber surface 225 it will encounter the reflective coating disposed over the contoured surface 210 and be reflected towards the fiber core 220 of the transmission fiber 215. This reflection and light propagation is simulated in FIG. 2D and FIG. 2E using an equivalent optical path representation.

Referring back to FIG. 2A and FIG. 2D, without being held to a particular theory or mechanism, the operation of the invention can be considered in terms of various ray transfer matrices M which operate on a light input position vector to produce an output position vector. As currently illustrated in the X-Z plan view, the mirror coated polished surface plays a role as a 45 degree tilted concave mirror. The equivalent ray transfer matrix can be designated as follows:

$$Mx = \begin{bmatrix} 1 & dx \\ 0 & 1 \end{bmatrix} \begin{bmatrix} 1 & 0 \\ 0 & n \end{bmatrix} \begin{bmatrix} 1 & r \\ 0 & 1 \end{bmatrix} \begin{bmatrix} 1 & 0 \\ \frac{-2}{R} & 1 \end{bmatrix} \begin{bmatrix} 1 & L \\ 0 & 1 \end{bmatrix} = \begin{bmatrix} A_x & B_x \\ C_x & D_x \end{bmatrix} \quad \text{(Eq. 1)}$$

In Eq. 1 the operational sequence of the constituent component matrices corresponds to a light beam propagating from the optical fiber with spot size $W_1$ guided by the lensed fiber and focused at a position which is dx distance away from surface 225 with spot size $W_{2x}$ as illustrated in FIG. 2D. The equivalent ray transfer matrix of (Eq. 1) can be understood by looking at its constituent component matrices. For ease of reference these matrices are labeled as follows:

$$\begin{bmatrix} 1 & L \\ 0 & 1 \end{bmatrix} \quad \text{(Mx1)}$$

$$\begin{bmatrix} 1 & 0 \\ \frac{-2}{R} & 1 \end{bmatrix} \quad \text{(Mx2)}$$

$$\begin{bmatrix} 1 & r \\ 0 & 1 \end{bmatrix} \quad \text{(Mx3)}$$

$$\begin{bmatrix} 1 & 0 \\ 0 & n \end{bmatrix} \quad \text{(Mx4)}$$

$$\begin{bmatrix} 1 & dx \\ 0 & 1 \end{bmatrix} \quad \text{(Mx5)}$$

The beam propagation from the transmission fiber 215 to the polished surface of the lensed fiber 200, along the distance L, is represented by (Mx1). The transformation of the light beam when it encounters the reflective coated polished surface of radius R, is given by (Mx2). The ray transfer component of $M_x$ which relates the beam propagation from the polished surface to the cylindrical surface of the coreless fiber after the beam has been bent 90 degrees along a distance r follows from (Mx3). The beam transformation of light at the interface exiting the cylindrical fiber surface into a different media (air) of index of refraction is given by (Mx4). The index of refraction for the lensed fiber 200 is n. The beam propagation from the lensed fiber surface 225 to a photodetector positioned along the x-axis, a distance dx between the fiber surface 225 and the photodetector, in free space is given by (Mx5). FIG. 2D also illustrates two beam waists $W_{2x}$ and $W_1$. These beam waist variables represent the narrowest points of the respective beams in various embodiments. Thus, the component entries of the Mx ray transfer matrix of (Eq. 1) are as follows:

$$Ax=1-2r/R-(2n/R)dx \quad Bx=L+(1-2L/R)r+n(1-2L/R)dx$$

$$Cx=-2n/R \quad Dx=n(1-2L/R)$$

When the sequence of its constituent component matrices of the ray transfer matrix in Eq. 1 is reversed, the ray transfer matrix M'x represents the beam propagating from a light source at dx with spot size $W_{2x}$ to fiber 215 with mode field radius $W_1$.

Figure 2G:
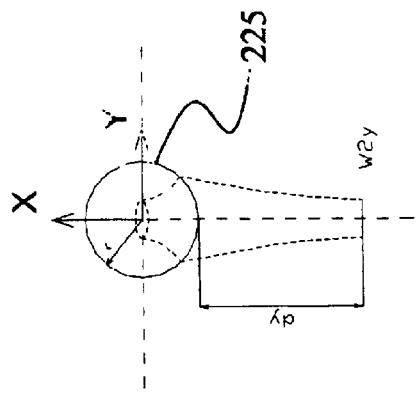
Figure 2F:
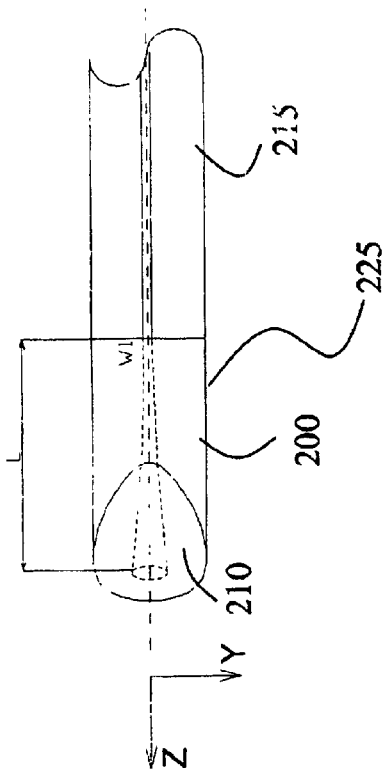

FIG. 2E, explores the behavior of the internal optics of the lensed fiber 200 by modeling the curved end radius of the fiber as a cylindrical lens for purposes of ray tracing. This is a simplifying assumption for modeling purposes as the actual lensed fiber 200 has a reflective surface where the circular portion 230 is shown in the cross-sectional view. This circular portion 230 represents a cross-section of a portion of the contoured surface 210. In various embodiments, this reflective surface will reflect, but not transmit light as shown in FIG. 2E. Without being bound to any particular theory or mechanism, the operation of the invention can be modeled in terms of various ray transfer matrices as has previously been discussed with respect to (Eq. 1). As currently illustrated in the Z-Y plan view of FIG. 2E, the light propagating from fiber 215, with a waist located at the interface of the fiber 215 and the lensed fiber 200 as shown in FIG. 2F, entering the lensed fiber 200 is marked as 240'. First light 240' propagates along in the Z direction for a distance L. Then the light 240' encounters contoured surface 210 and is reflected and bent 90 degrees, as shown in FIG. 2F. After bending, light 240' propagates along the X direction, and further propagates a distance r. Then light 240' encounters fiber surface 225 as shown in FIG. 2G. Encountering the surface only bends light 240' 90 degrees, it does not change the light's 240' other characteristics. Therefore it is equivalent to consider light 240' as propagating a distance L+r and then encountering a circular portion 230 as shown in FIG. 2E. The circular portion 230 transforms light 240' into light 240 and focuses the light at position which is located a dy distance from the circular portion 230 with a spot size of $W_{2y}$.

The propagation of light beams 240' and 240 represent the focusing of light beams that will result when light enters the lensed fiber 200 and is redirected by the reflective coating disposed on the contoured surface 210. The equivalent ray transfer matrix for the lens system shown in FIG. 2E is given by:

$$My = \begin{bmatrix} 1 & dy \\ 0 & 1 \end{bmatrix} \begin{bmatrix} 1 & 0 \\ \frac{1-n}{r} & n \end{bmatrix} \begin{bmatrix} 1 & L+r \\ 0 & 1 \end{bmatrix} = \begin{bmatrix} A_y & B_y \\ C_y & D_y \end{bmatrix} \quad \text{(Eq. 2)}$$

The equivalent ray transfer matrix of (Eq. 2) can be understood by looking at its constituent matrices. For ease of reference these matrices are labeled as follows:

$$\begin{bmatrix} 1 & L+r \\ 0 & 1 \end{bmatrix} \quad \text{(My1)}$$

$$\begin{bmatrix} 1 & 0 \\ \frac{1-n}{r} & n \end{bmatrix} \quad \text{(My2)}$$

$$\begin{bmatrix} 1 & dy \\ 0 & 1 \end{bmatrix} \quad \text{(My3)}$$

The matrix component relating the beam propagation in the lensed fiber 200, over the distance L+r, is given by (My1). The beam transformation which occurs upon encountering the cylindrical surface 225 of the lensed fiber 200 is given by (My2). The beam propagation from the lensed fiber 200 to its beam waist in Y-Z plan in free space is given by (My3). Thus, the component entries of the $M_y$ ray transfer matrix of (Eq. 2) are as follows:

$$Ay=1+((1-n)/r)dy \quad By=L+r+((L+r-nL)/r)dy$$

$$Cy=(1-n)/r \quad Dy=(L+r-nL)/r$$

When the sequence of its constituent component matrices of the ray transfer matrix in Eq. 2 is reversed, the ray transfer matrix becomes M'y which represents the beam propagating from a light source at position which is dy distance from the cylindrical surface 225 with a spot size $W_{2x}$ towards fiber 215 with mode field radius $W_1$.

The various parameters labeled in FIGS. 2D and 2E can be combined to formulate a series of equations. These equations in turn can be used to model the behavior of the lensed fiber coupler. The variable $\eta$ can be defined such that $\eta=(\lambda_1/(\pi W_1^2))^2$. Thus it follows that $1/\eta=((\pi W_1^2)/\lambda_1)^2$. The index of refraction n relates the propagation of wavelengths in the lensed fiber 200 to the propagation of wavelengths of light outside both the lensed and transmission fibers. The lensed fiber 200 and the core of the transmission fiber 215 are chosen to have the same index of refraction in various embodiments. The wavelengths are designated, $\lambda_1=\lambda/n$ and $\lambda_2=\lambda$, this designation illustrates the use of the 1 subscript for events in the fiber and the 2 subscript for events or phenomena outside of the fibers of the invention in FIGS. 2D and 2E. This subscript convention also applies to the beam waist designations.

The interrelation of these parameters can be seen in equations (Eq. 3) through (Eq. 11) listed below. The interplay of these equations serves as a mathematical model for selecting various parameters for fabricating lensed fiber couplers in accordance with the principles of the invention.

$$AxCx+\eta BxDx=0 \quad \text{(Eq. 3)}$$

$$(W_{2x}/W_1)^2=(\lambda_2/\lambda_1)/(C_x^2/\eta+D_x^2) \quad \text{(Eq. 4)}$$

$$d_x = -\frac{2n(2r/R-1)/R+\eta nL(1-2L/R)+\eta nr(1-2L/R)^2}{4n^2/R^2+\eta(1-2L/R)^2 n^2} \quad \text{(Eq. 5)}$$

$$W_{2x}=W_1[(\lambda_2/\lambda_1)/(C_x^2/\eta+D_x^2)]^{1/2} \quad \text{(Eq. 6)}$$

$$W_{2x}=W_1[(\lambda_2/\lambda_1)/\{4n^2/(R^2\eta)+n^2(1-2L/R)^2\}]^{1/2} \quad \text{(Eq. 7)}$$

$$AyCy+\eta ByDy=0 \quad \text{(Eq. 8)}$$

$$(W_{2y}/W_1)^2=(\lambda_2/\lambda_1)/(C_y^2/\eta+D_y^2) \quad \text{(Eq. 9)}$$

$$d_y = -\frac{(1-n)/r + \eta(L+r)(L+r-nL)/r}{(1-n)^2/r^2 + \eta(L+r-nL)^2/r^2} \quad \text{(Eq. 10)}$$

$$W_{2y} = W_1[(\lambda_2/\lambda_1)/\{(1-n)^2/(r^2\eta)+(L+r-nL)^2/r^2\}]^{1/2} \quad \text{(Eq. 11)},$$

FIGS. 2F and 2G provide additional views of the illustrative embodiment shown in FIG. 2E. A light beam of length L is shown narrowing to its waist $W_1$ within the lensed fiber 200. Light exiting the cylindrical surface 225 of the lensed fiber 200 is shown narrowing to an external waist $W_{2y}$ in FIG. 2G. The light being emitted from the cylindrical surface 225 is exiting from a portion of the cylindrical surface disposed opposite the reflective coating 210. These FIGS. 2F and 2G, taken together with FIG. 2E illustrate various equivalent optical paths used to model the lensed fiber 200 in various embodiments.

Figure 2I:
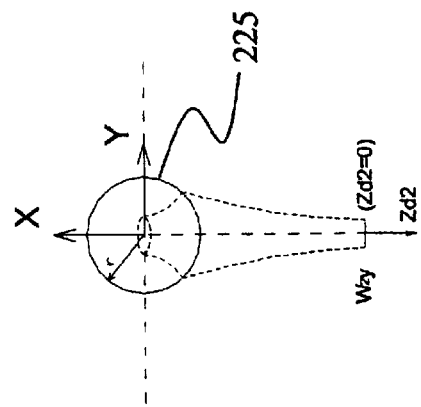
Figure 2H:
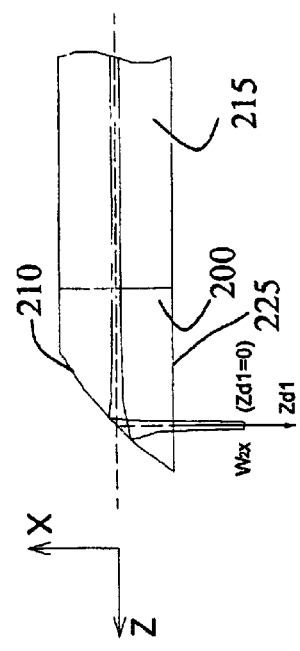

Two other parameters suitable for modeling various aspects of the lensed fiber 200 are shown in FIGS. 2H and 2I. These parameter variables are $Z_{d1}$ and $Z_{d2}$, $Z_{d1}$ and $Z_{d2}$ are defined as defocused distances along different beam axes located outside the lensed fiber. $Z_{d1}$ is shown in FIG. 2H and $Z_{d2}$ is shown in FIG. 2I. The positions of the beam waists external to the lensed fiber, $W_{2x}$ and $W_{2y}$, correspond to the positions established when the parameters, $Z_{d1}$ and $Z_{d2}$, equal zero along their respective axis. In various embodiments, when $Z_{d1}=0$ and $Z_{d2}=0$ the corresponding axial positions of the associated light beams function as focusing points as shown in FIGS. 2H and 2I.

Although various illustrative views and embodiments have been previously described, some aspects of the invention can be described at a general level. The mechanism of coupling the beam from a light source to the single mode fiber or to send light from a single mode fiber to an optical receiver, such as a photodetector chip, in accordance with the principles of the invention is analogous to using a lens system using a 45 degree mirror reflector and two cylindrical lenses. The polished and coated end of the coreless fiber is the reflector and the first cylindrical lens, and the coreless fiber surface itself is the second cylindrical lens. The index of the coreless fiber is the same as the core of the single mode fiber. Thus, there is no substantial reflection in the interface between the coreless fiber and the single mode fiber. These properties and the above equations provide for selecting the operational range of a given lensed fiber coupler prior to its fabrication.

Figure 3A:
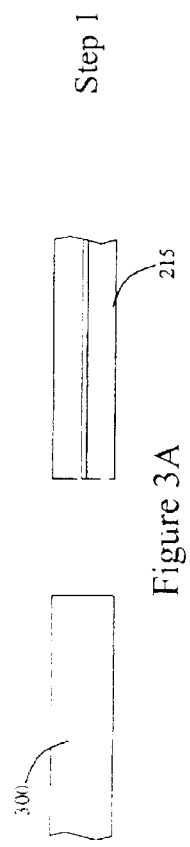
FIGS. 3A–3E are a series of schematic views of fabrication stages showing a generalized lensed fiber coupler fabrication method according to an illustrative embodiment of the invention.
Figure 3B:
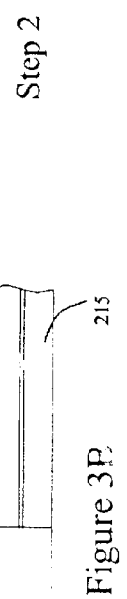
Figure 3C:
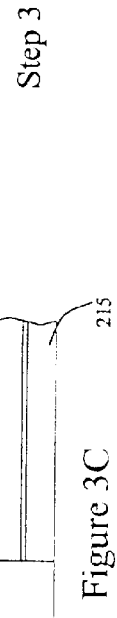
Figure 3D:
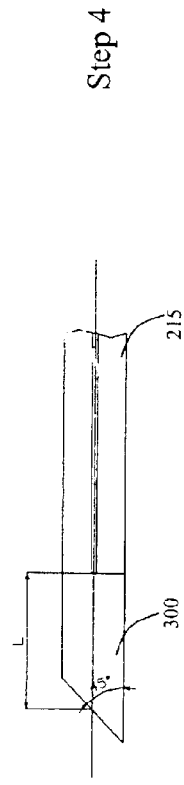
Figure 3E:
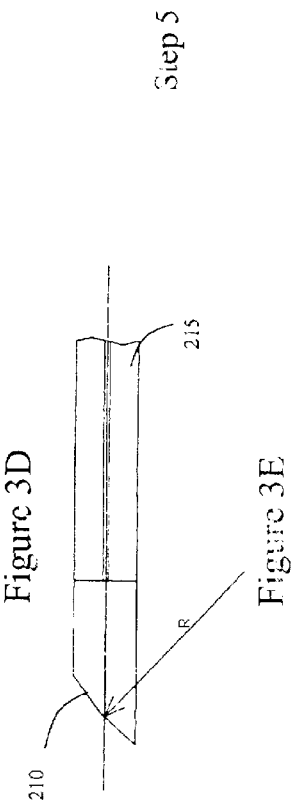

Referring to FIGS. 3A–3E, a fabrication process for manufacturing a lensed fiber in accordance with the invention is illustrated. Initially an optical fiber 300 and a transmission fiber 215 are provided (Step 1) as shown in FIG. 3A. In FIG. 3B, the optical fiber is 300 is joined (Step 2) to the transmission fiber 215. The joining of the two fibers is typically carried out by fusing splicing. The length of the optical fiber 300 is modified (Step 3) as shown in FIG. 3C. This modification (Step 3) is optional as the optical fiber can be provided at the predetermined appropriate length. Referring to FIG. 3D, the optical fiber 300 is shaped (Step 4) to have an angled end face. This is typically achieved by cutting or polishing the end face of the fiber. Various angles can be imparted (Step 4) to the fiber end face. In various embodiments, the fiber end face is shaped to have a 45 degree angle as shown in FIG. 3D. The angled end face surface of the fiber is then shaped to form a contoured surface 210. This contoured surface 210 is a portion of the surface of a cylindrical solid with a circular, ellipsoidal, parabolic or other suitable cross-section.

Figure 4:
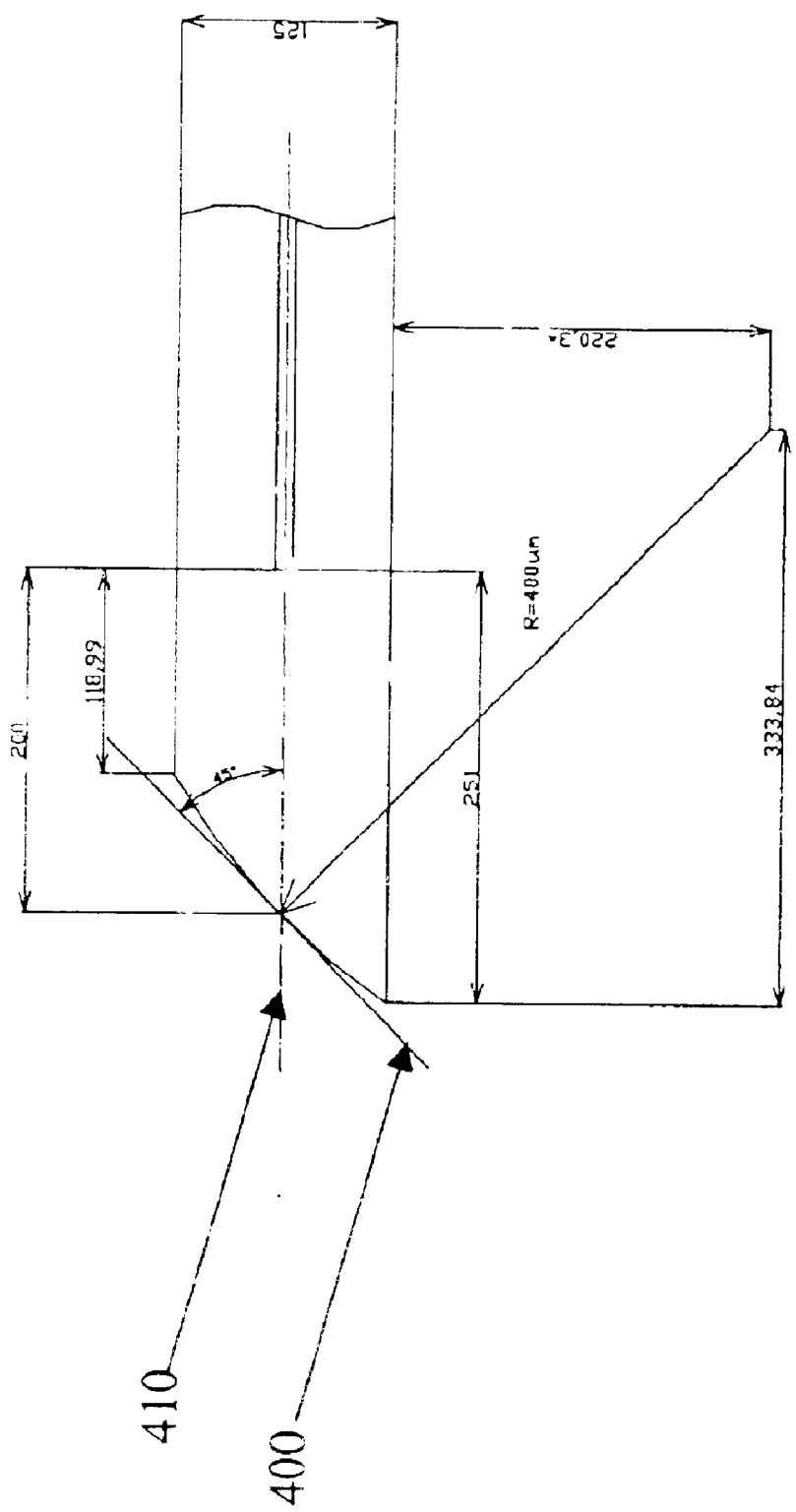
FIG. 4 is a lensed fiber coupler fabricated according to an aspect of the invention.

A specific embodiment is illustrated in FIG. 4 that has been produced by the fabrications process outlined in FIGS. 3A–3E, the length parameter L was chosen to be 200 μm and the cylindrical radius R was set at 400 μm. The diameter of the fiber, D=2r, is shown as 125 μm. A tangent line 400 is shown intersecting the cylindrical radius R at an angle of 90 degrees. This tangent line 400 is tangent to the contoured surface. The tangent line is oriented 45 degrees away from the central light transmitting axis 410. This property of the tangent line 400 is found in various embodiments of the invention. The values shown in FIG. 4 are approximate and only illustrate one specific embodiment.

Figure 5B:
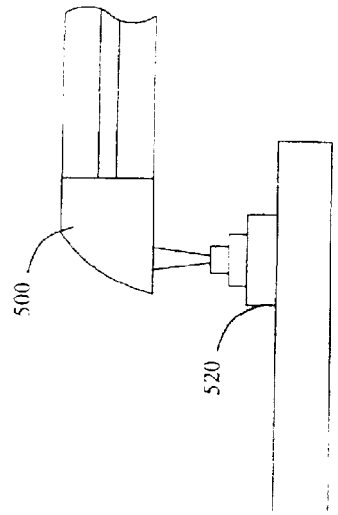
FIGS. 5A–5C are a series of schematic views showing the operation of illustrative embodiments of the invention.
Figure 5C:
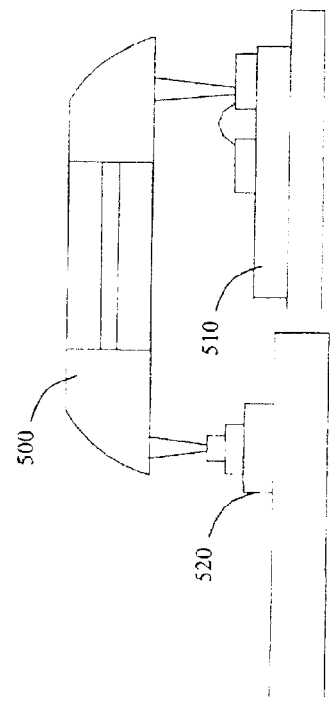
Figure 5A:
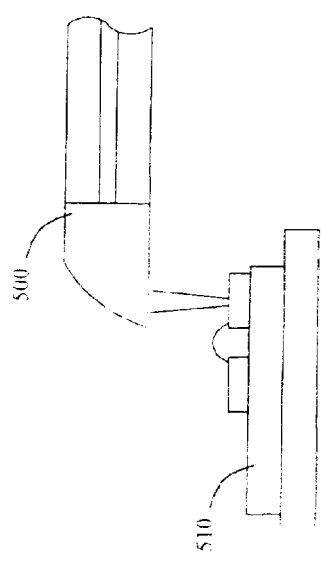
Figure 5A:
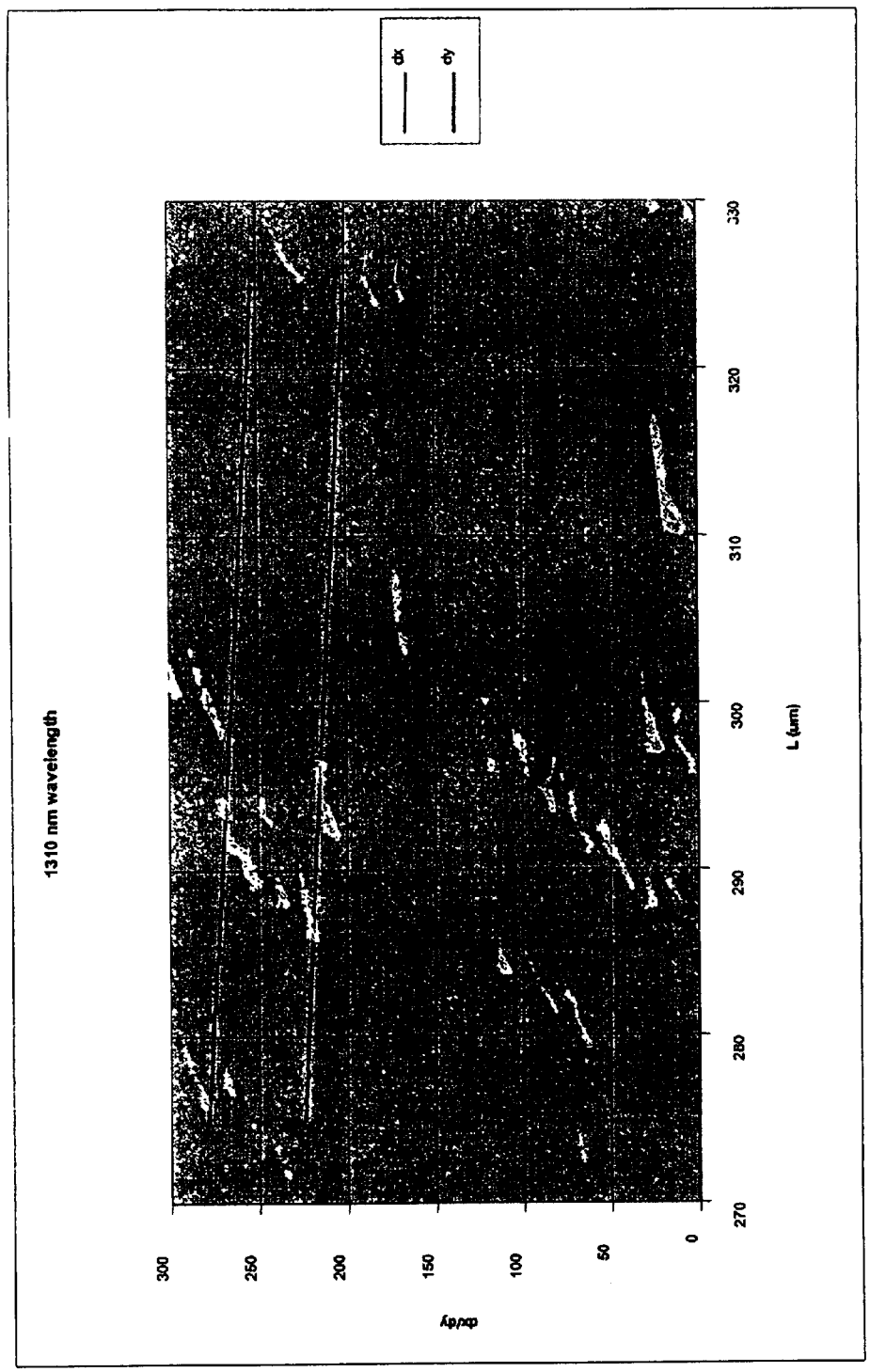

FIGS. 5A–5C provide general views of a lensed fiber coupler 500 in accordance with the invention being used to direct light from an optical source. In FIG. 5A, an optical receiver 510, such as an avalanche photodiode or a PIN photodiode receiver, is shown as receiving light from the optical source (not shown). While in FIG. 5B a Vertical Cavity Surface Emitting Laser (VCSEL) 520 is shown as the optical source transmitting light into the lensed fiber coupler 500. FIG. 5C shows a lensed fiber coupler 500 receiving light from an optical source 510 and redirecting it in another direction. The lensed fiber coupler 500 can be used to both receive and project light in some embodiments as shown in FIG. 5C. Light is shown being transmitted along two transmission axis in the FIGS. 5A–5C. Light is transmitted along the longitudinal axis of the lensed fiber in addition to being transmitted perpendicular to the longitundinal axis. Other transmission axes are possible in various embodiments.

Referring to FIGS. 6A–6D and FIGS. 7A–7D, simulation results using (Eq. 1) through (Eq. 11) are shown. The parameters referred to in the graphs correspond, in part, to the equations and the illustration shown in FIG. 2D and FIG. 2E. The characteristics of the lensed fibers used for the various simulation runs were:

| Wavelength λ (nm) | MFD (um) | $W_1$ (um) | n |
| --- | --- | --- | --- |
| 1310 | 9.2 | 4.6 | 1.4677 |
| 1550 | 10.5 | 5.25 | 1.4682 |

The MFD stands for the mode field diameter. The wavelength of 1310 nm was used in FIGS. 6A–6D as the wavelength of light transmitted from the optical source in the simulation. The wavelength of 1550 nm was used in FIGS. 7A–7D as the wavelength of light from the optical source in the simulation. The index of refraction of the substantially single mode fibers used was n. The beam waist $W_1$ corresponds to the mode field radius of the fiber as shown in FIGS. 2D and 2E.

The radius value, r=62.5 um, in the model is determined by standard single mode fiber structure. In the numerical analysis this parameter is taken as a constant. In some applications, this radius parameter r is variable if the fiber is etched. The range for r can be from 25–62.5 um in various embodiments. In order to focus the beam from the single mode fiber to a spot much smaller than the mode field radius of the single mode fiber, it is necessary to etch the fiber to generate an r smaller than 62.5 um. The upper limit for radius is the radius of the fiber functioning as a lensed fiber 200. In various embodiments, the transmission fiber 215 has the same radius r as the lensed fiber 200. The accuracy of the etching process, for modifying r, is approximately +/−0.3 um.

Figure 6B:
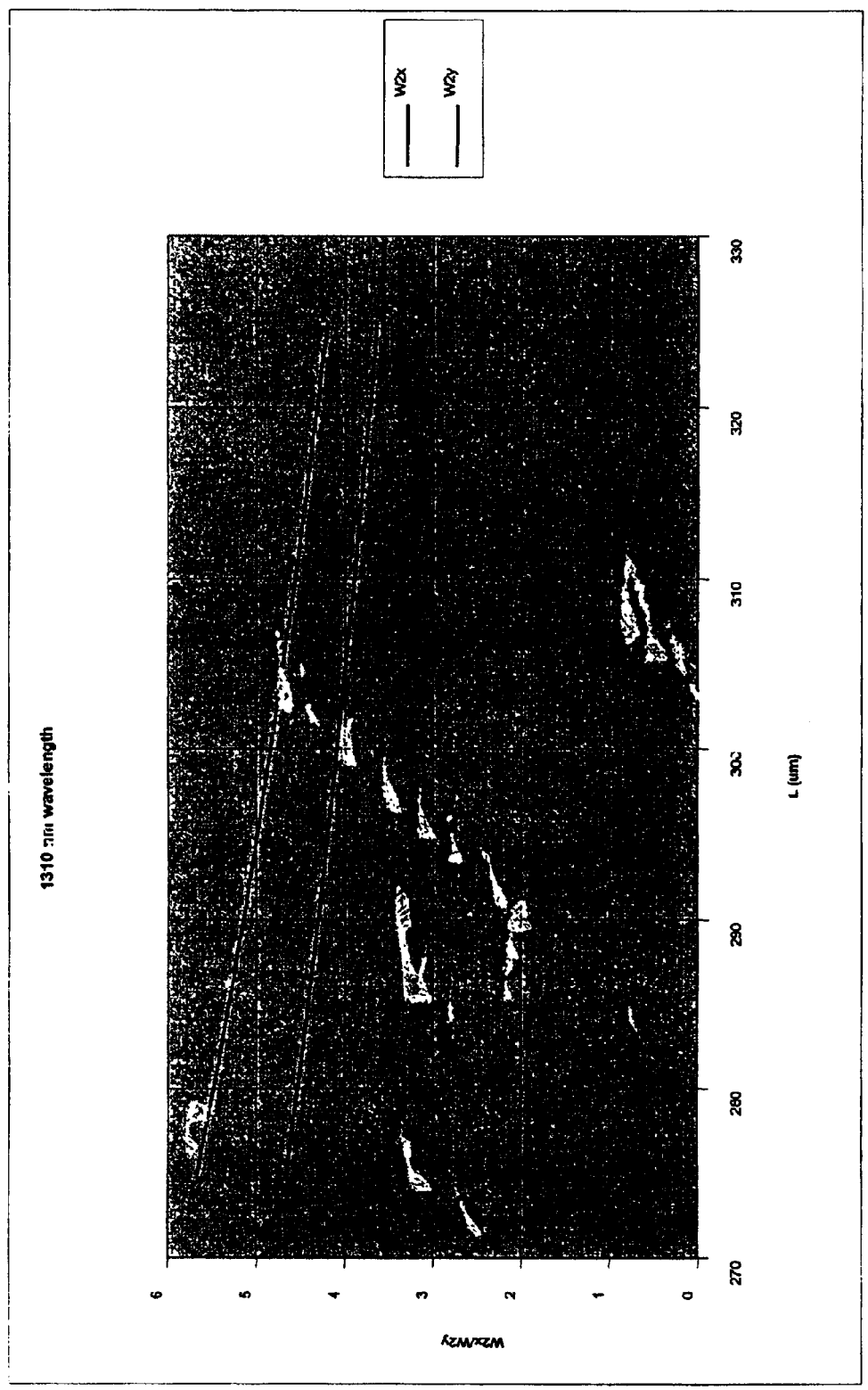
Figure 7A:
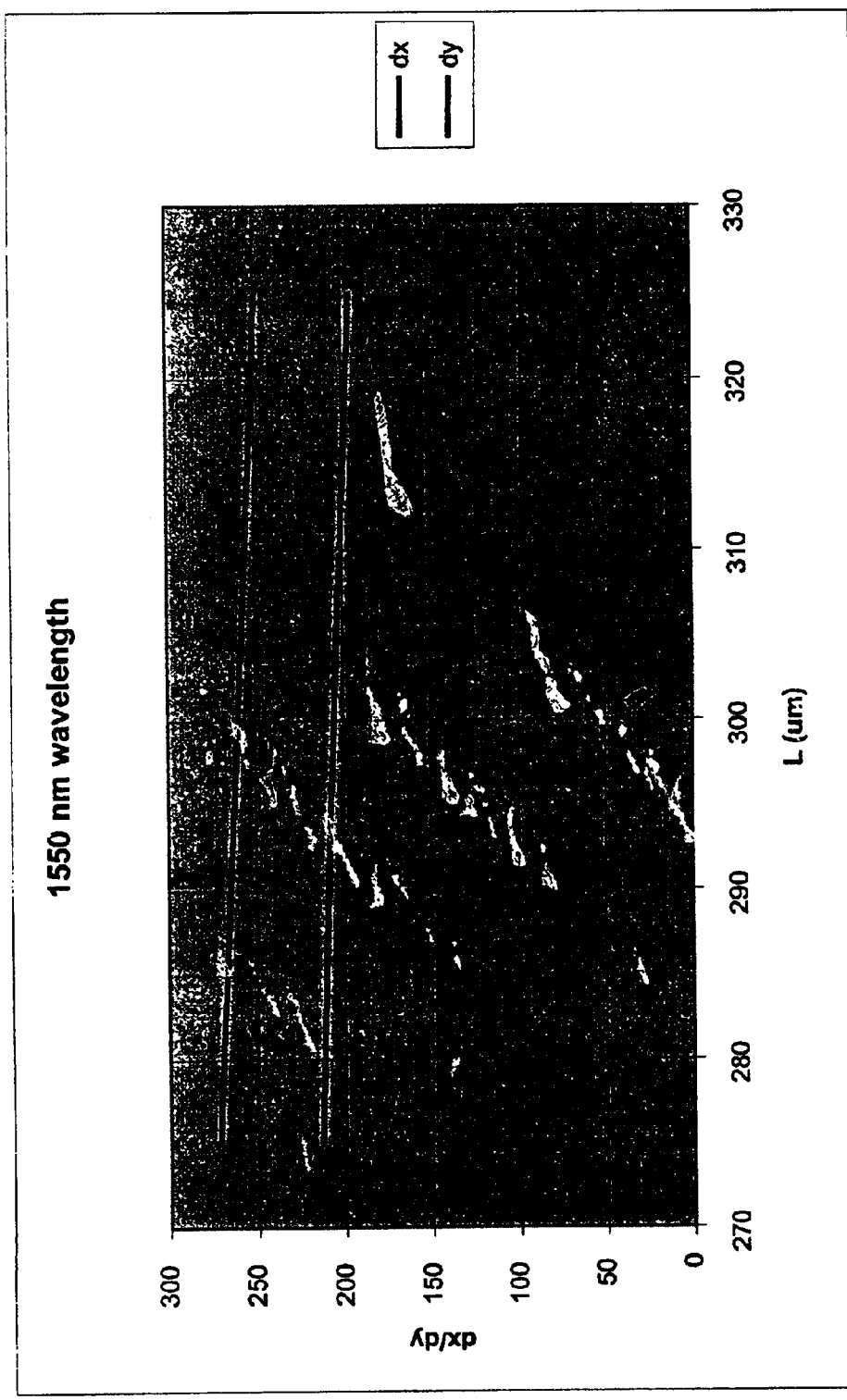
FIGS. 7A–7E are graphs illustrating various properties of an illustrative embodiment of the invention simulated using a 1550 nm wavelength light.
Figure 7B:
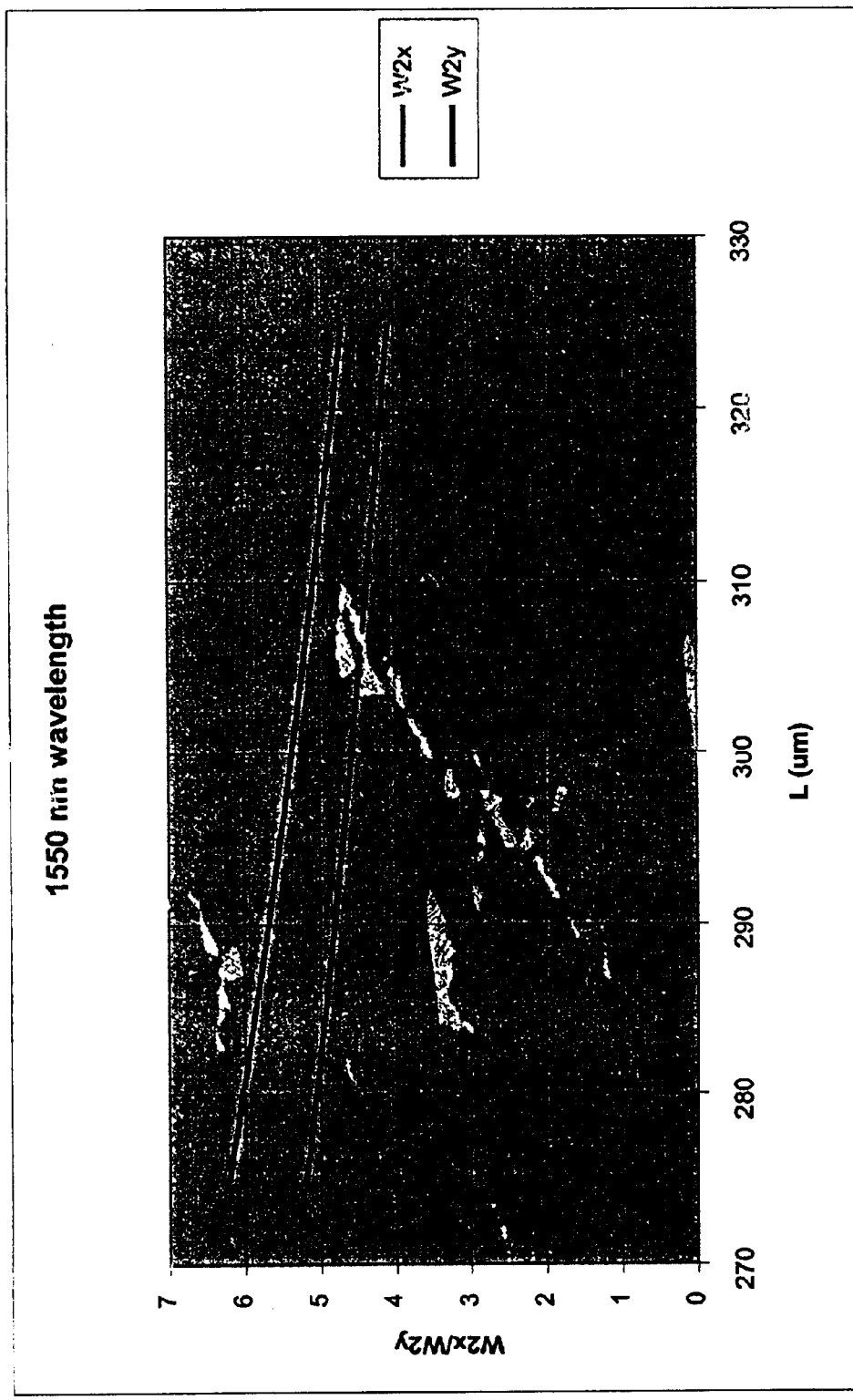

The simulation results for dx, dy, $W_{2x}$ and $W_{2y}$ as a function of L, assuming a constant wavelength λ=1310 nm, and cylindrical radius R=360 um are shown in FIGS. 6A and 6B. If the simulation is evaluated with a 1550 nm input wavelength, an R=360 μm, an r=62.5 μm, $W_1$=5.25 μm, and an n=1.4682 the results in FIGS. 7A and 7B are obtained. FIGS. 6A and 6B illustrate the finding that when L is in the range of 275~325 um, the difference between dx and dy is about 50 um, and the difference between $W_{2x}$ and $W_{2y}$ is about 0.5 to 1 um.

The graphs in FIGS. 7A and 7B resemble the results for λ=1310 nm. But $W_{2x}$ and $W_{2y}$ are slightly larger than those for λ=1310 nm by about 0.5 um. Both of the simulation results for λ=1310 nm and λ=1550 nm are acceptable for application of the lensed fiber to photo receiver modules when a spot diameter about 10 um is needed for the incident beam on the window of PIN or APD chip. These principles encompass all possible suitable optical devices wherein a direct light beam is required.

Figure 6C:
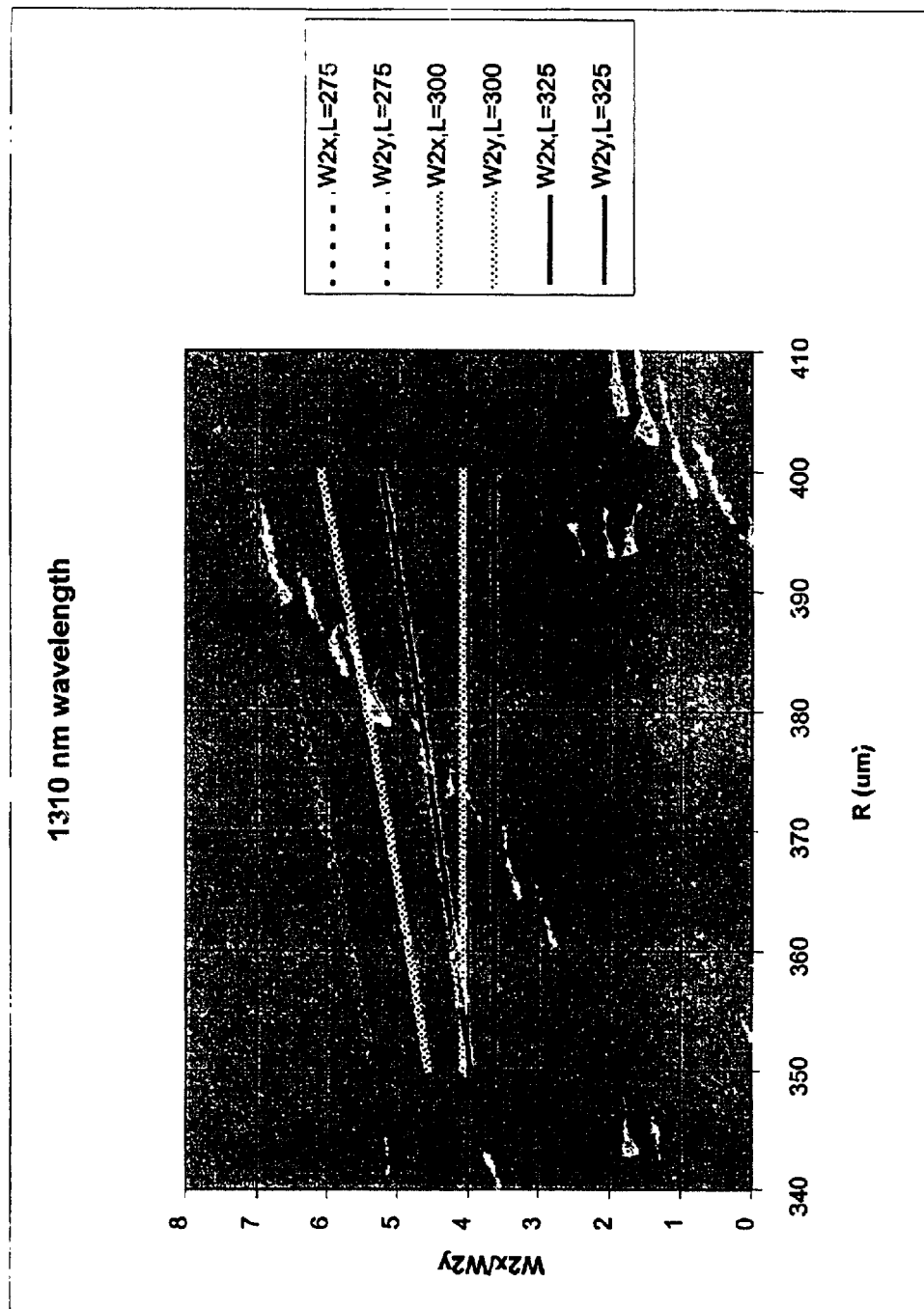
Figure 6D:
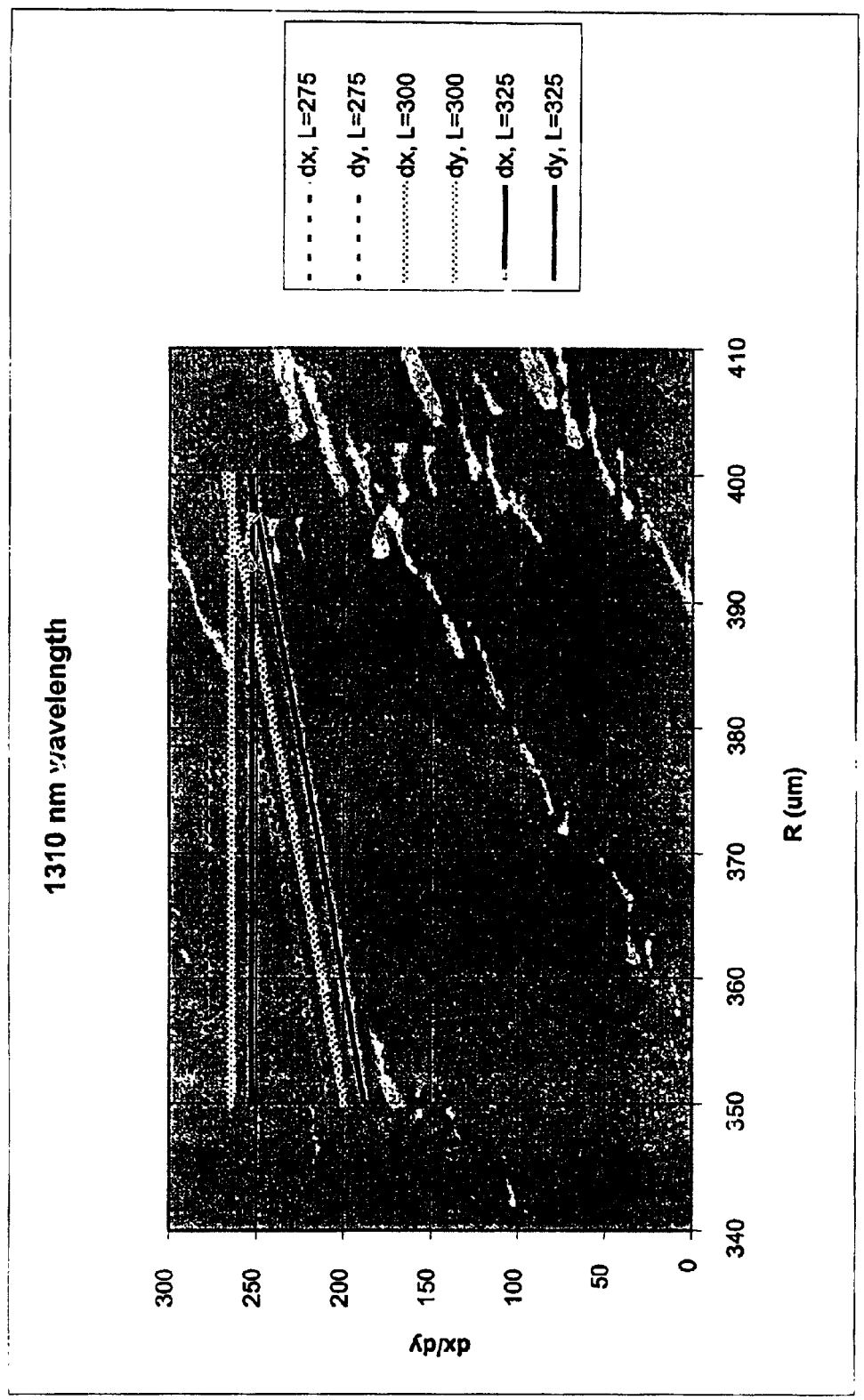
Figure 6E:
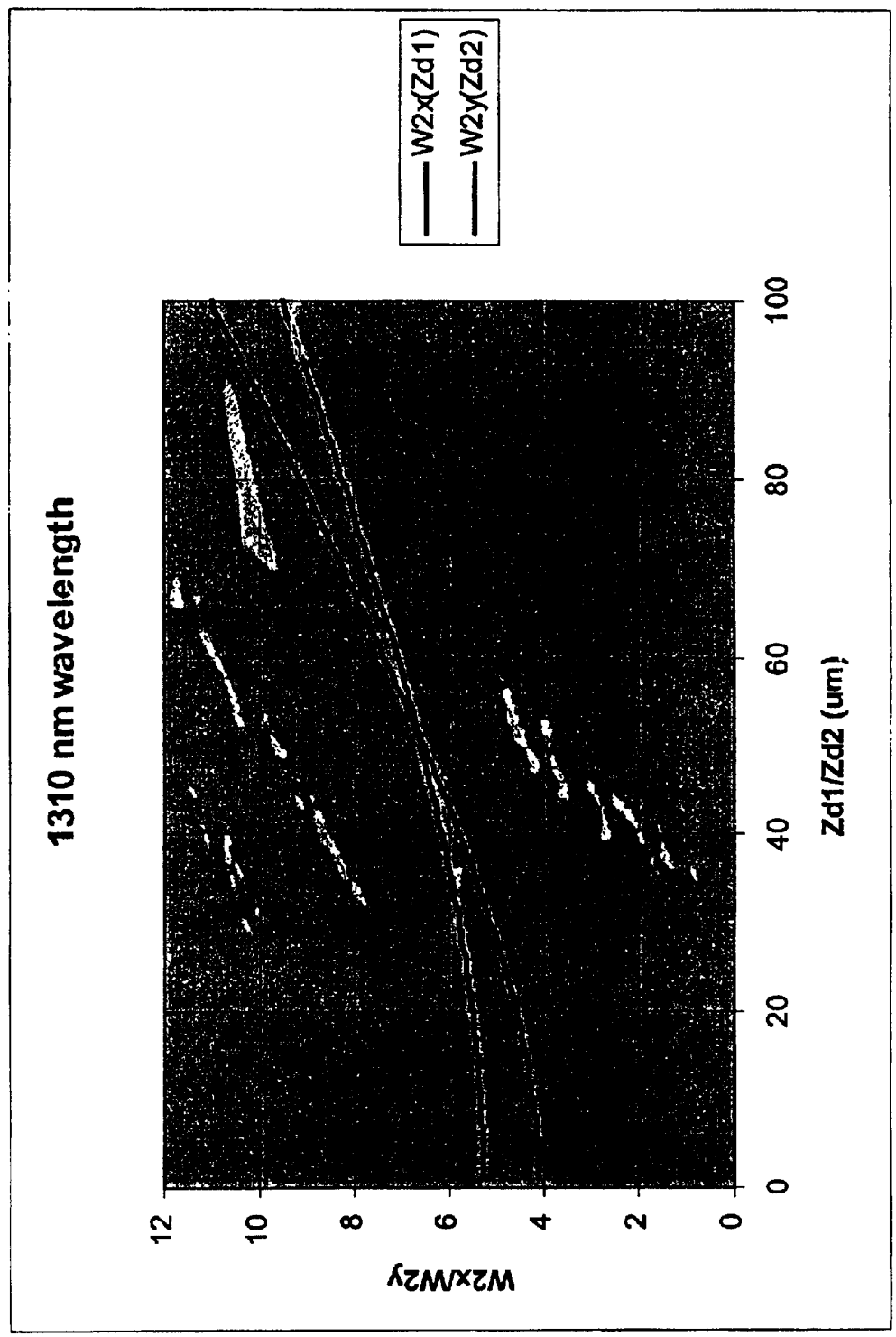
Figure 7C:
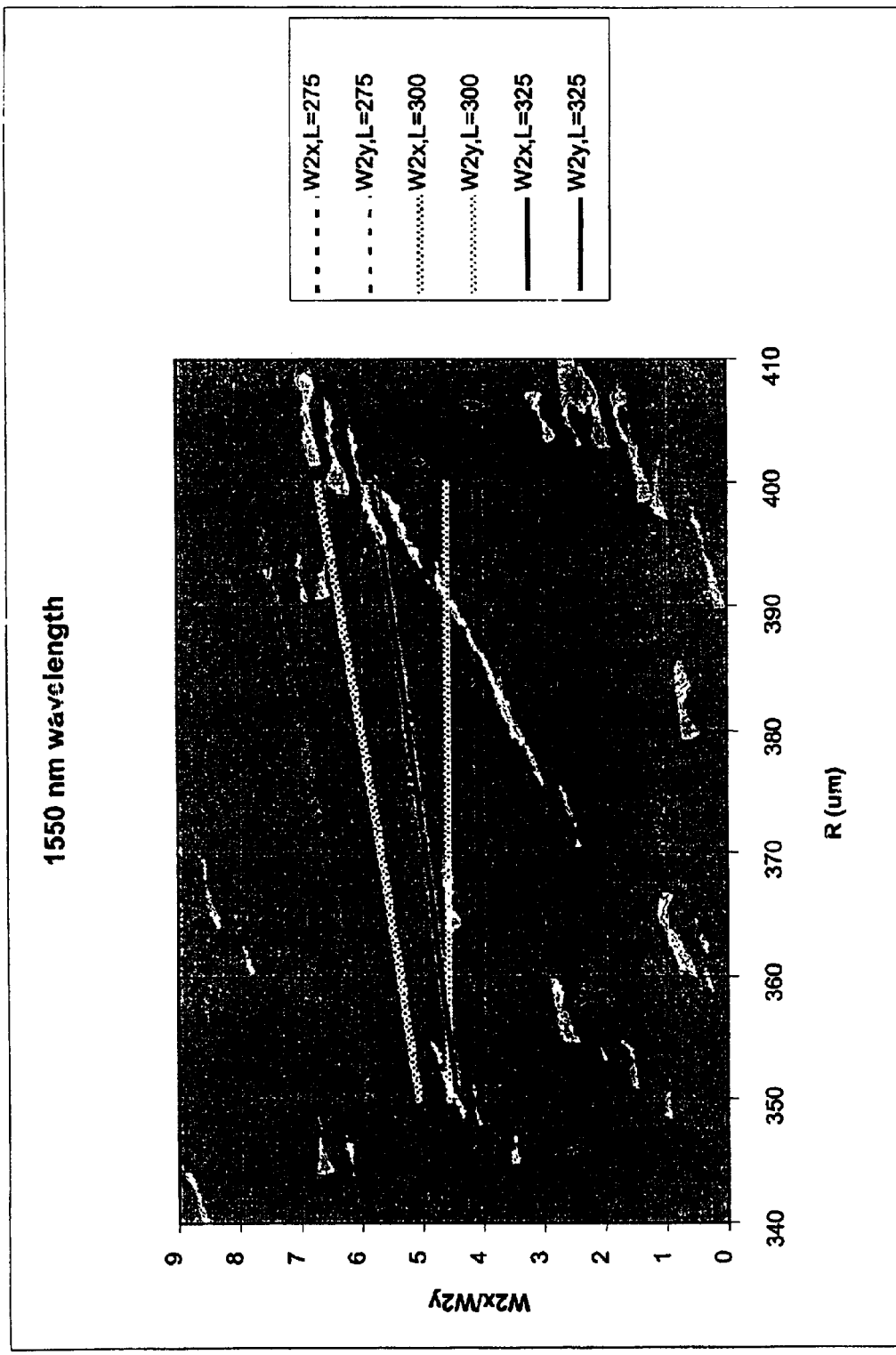
Figure 7D:
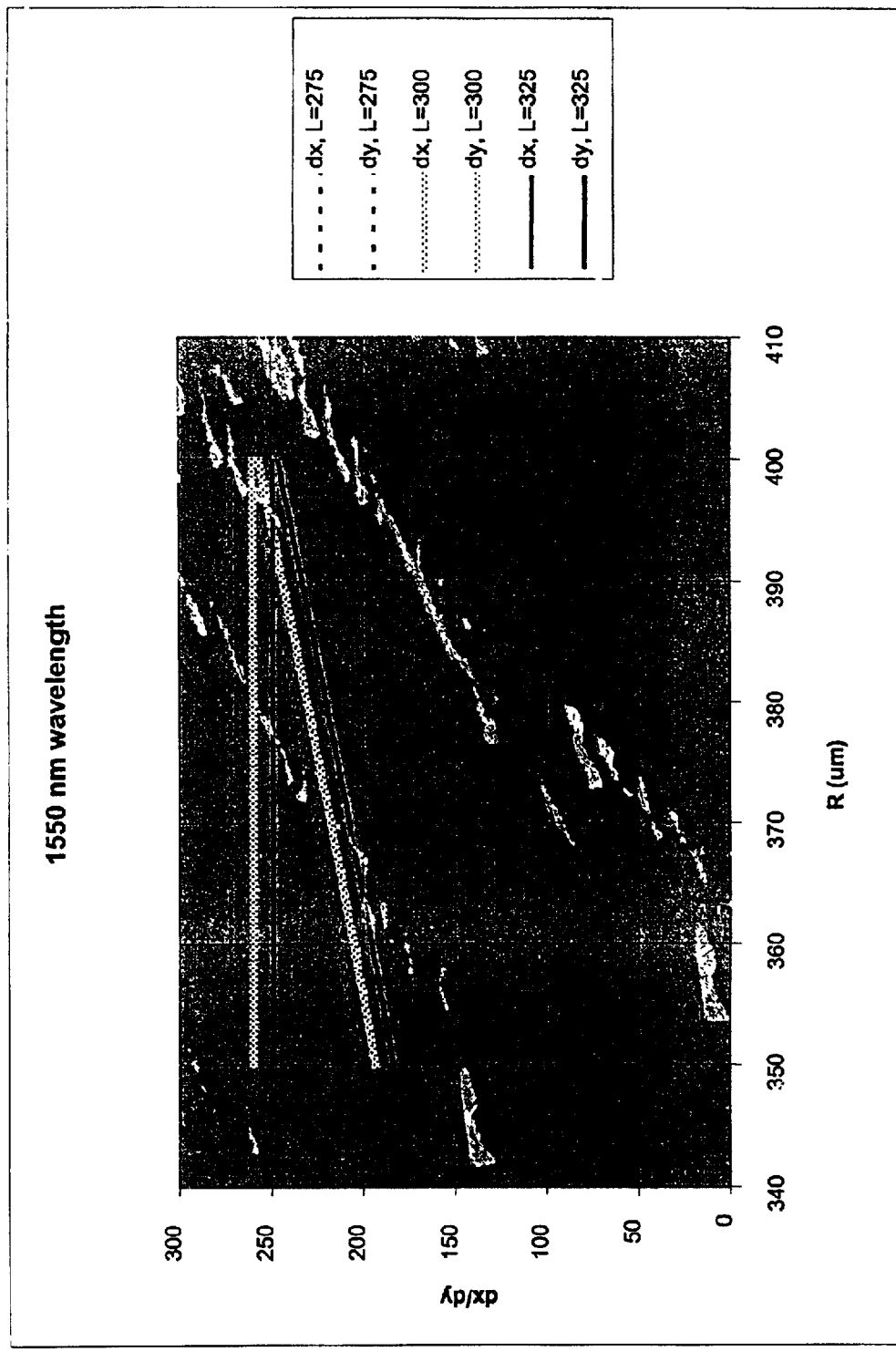
Figure 7E:
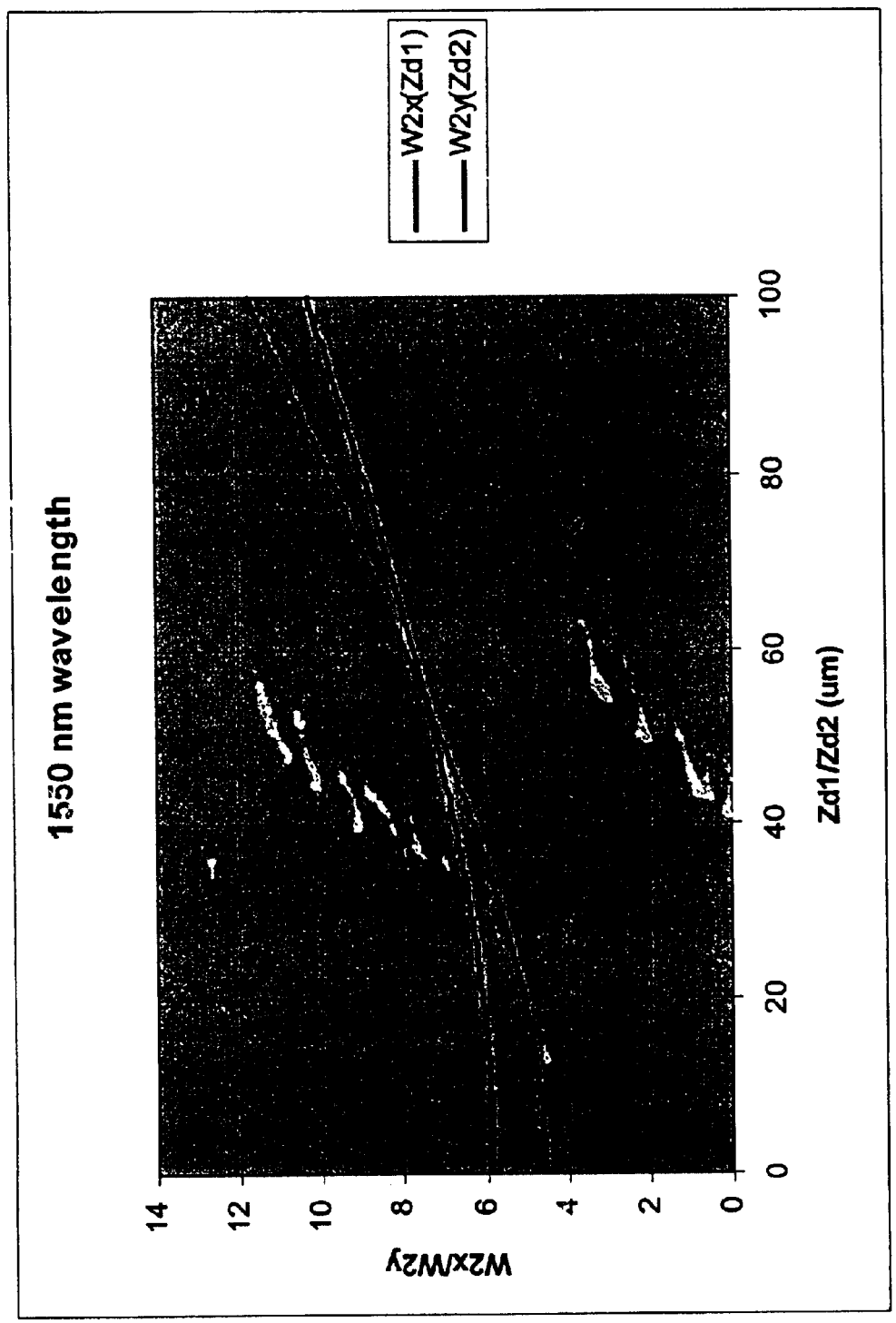

FIGS. 6C and 6D and FIGS. 7C and 7D show the simulation results of dx and $W_{2x}$ as a function of R assuming L=275 um, 300 um and 325 um. λ=1310 nm, r=62.5, $W_1$=4.6, and n=1.4677 are used in FIGS. 6C and 6D. λ=1550 nm, r=62.5, $W_1$=5.25, and n=1.4682 are used in FIGS. 7C and 7D. In these figures of illustrating the simulation the range of possible R's ranges from 350 to 400 um. $W_{2y}$ and dy are also shown in the graphs. Both for λ=1310 nm and λ=1550 nm, when R is larger (approaching 400 um) dx is gradually approaching dy and when R is smaller (approaching 350 um) $W_{2x}$ is approaching $W_{2y}$. One aspect of the invention is to focus a round spot with approximately the same focus distance on X-Z and Y-Z plan. Therefore in some embodiments it is desirable to have an R value between 350 and 400 um. Referring to FIGS. 6E and 7E, the simulation results of $W_{2x}(z_{d1})$ and $W_{2y}(z_{d2})$ as shown as a function of distances $z_{d1}$ and $z_{d2}$. The $W_{2x}(z_{d1})$ and $W_{2y}(z_{d2})$ designations are used designate each beam radius as a mathematical function of associated $z_{d1}$ and $z_{d2}$ values. These parameters are previously described with respect to FIGS. 2H and 2I. The parameters for FIGS. 6E and 7E are as follows:

| | | |
|---|---|---|
| L = 300 | R = 375 | r = 62.5 |
| Lamda = 1.31 | n = 1.4677 | $W_{2x}$ = 5.276734 $W_{2y}$ = 4.085598 |
| Lamda = 1.55 | n = 1.4682 | $W_{2x}$ = 5.835133 $W_{2y}$ = 4.574961 |

Since $W_{2x}$ is larger than $W_{2y}$ and dx is shorter than dy by about 50 um when R is in the range between 350 um and 400 um, it is possible produce a substantially round spot with a diameter of about 11 um for λ=1310 nm and 12 um for λ=1550 nm on the window of a PIN chip, or other suitable optical device, if dx is chosen as the working distance of the lensed fiber. In this arrangement, on Y-Z plane the beam is defocused by about −35 um. In this instance, $W_{2y}$(−35 um) is approximately equal to $W_{2x}$ according to the simulation results. This result is suitable for use with various optical devices such as a photo receiver module.

While the present invention has been described in terms of certain exemplary preferred embodiments, it will be readily understood and appreciated by one of ordinary skill in the art that it is not so limited and that many additions, deletions and modifications to the preferred embodiments may be made within the scope of the invention as hereinafter claimed. Accordingly, the scope of the invention is limited only by the scope of the appended claims.

What is claimed is:

1. An optical fiber having a modified geometry, the optical fiber comprising:

an optical fiber portion, having a first fiber end face and a cylindrical fiber surface encircling the first fiber end face, wherein a circular cross-section of the optical fiber portion has a radius r;

a contoured surface formed from the first fiber end face, the contoured surface and the optical fiber portion forming a first substantially cylindrical lens;

a reflective coating disposed on the contoured surface; and an optical transmission region formed from a portion of the cylindrical fiber surface, wherein the optical transmission region is a portion of a cylindrical solid, the optical transmission region and the optical fiber portion forming a second substantially cylindrical lens.

2. The optical fiber of claim 1 wherein the first and second substantially cylindrical lenses are shaped to focus a substantially round spot exterior to the optical fiber in response to light.

3. The optical fiber of claim 1 further comprising a single mode transmission fiber having a fiber core, the core of the transmission fiber and the optical fiber portion having substantially the same index of refraction.

4. The optical fiber of claim 1 wherein the contoured surface is defined by a cylindrical radius R and a fiber length L.

5. The optical fiber of claim 1 wherein the contoured surface is substantially convex.

6. The optical fiber of claim 1 wherein the reflective coating is a gold film.

7. The optical fiber of claim 1 wherein the reflective coating is a dielectric reflective coating.

8. A lensed optical fiber coupler comprising:

an optical fiber, having at least one fiber end face and a cylindrical fiber surface encircling the at least one fiber end face;

an optical transmission region formed from a portion of the cylindrical fiber surface, wherein the optical transmission region is a portion of a cylinder, the optical transmission region adapted to form a first substantially cylindrical lens; and a curved reflective surface formed from the at least one fiber end face, wherein the curved reflective surface focuses light towards a point along a transmission axis intersecting the curved reflective surface, the curved reflective surface adapted to form a second substantially cylindrical lens.

9. The lensed optical fiber coupler of claim 8 having the transmission axis substantially coincide with the longitundial axis of the optical fiber.

10. The lensed optical fiber coupler of claim 8 having the transmission axis intersect the optical transmission region, wherein the transmission axis is substantially perpendicular to the longitudinal axis of the optical fiber.

11. The lensed optical fiber coupler of claim 8 wherein the curved reflective surface is a portion of a cylinder, wherein the cylinder has a circular cross-section and the curved reflective surface is substantially convex.

12. The lensed optical fiber coupler of claim 8 wherein the curved reflective surface has a cross-section that is substantially parabolic.

13. The lensed optical fiber coupler of claim 8 wherein the curved reflective surface has a cross-section that is a portion of an ellipse.

14. A fiber system comprising:

a transmission fiber, wherein the transmission fiber comprises a transmission fiber core;

a coupling fiber, wherein the coupling fiber comprises an optical fiber, having at least one fiber end face and a cylindrical fiber surface encircling the at least one fiber end face;

an optical transmission region formed from a portion of the cylindrical fiber surface, wherein the optical transmission region is a portion of a cylinder, the optical transmission region forming a first substantially cylindrical lens; and a curved reflective surface formed from the at least one fiber end face, wherein the curved reflective surface focuses light towards a point along a transmission axis intersecting the curved reflective surface, the curved reflective surface forming a second substantially cylindrical lens.

15. The fiber system of claim 14 having the transmission axis substantially coincide with the longitundial axis of the transmission fiber.

16. The fiber system of claim 14 having the transmission axis intersect the optical transmission region, wherein the transmission axis is substantially perpendicular to the longitudinal axis of the transmission fiber.

17. The fiber system of claim 14 wherein the curved reflective surface is a portion of a cylinder, wherein the cylinder has a circular cross-section and the curved reflective surface is substantially convex.

18. A lensed optical fiber coupler comprising:
a cylindrical optical fiber having a constant index of refraction, having a circular cross-section, a longitudinal z-axis, and
a cylindrical fiber surface, wherein the circular cross-section is orthogonal to the longitudinal z-axis thereby defining a portion of a y-x plane;
a substantially convex contoured surface, wherein a cross-section of the contoured surface observed in a z-x plane is a substantially cylindrical portion, a portion of the substantially convex contoured surface forms a first substantially cylindrical lens;
a reflective coating disposed upon the contoured surface; and
an optical transmission region formed from a portion of the cylindrical fiber surface, a portion of the optical transmission region forms a second substantially cylindrical lens.

19. The lensed optical fiber coupler of claim 18 wherein the first and second substantially cylindrical lenses are shaped to focus a substantially round spot exterior to the cylindrical optical fiber in response to light of wavelength $\lambda$.

20. The lensed optical fiber coupler of claim 18 wherein the substantially round spot has a diameter of about 11 $\mu$m for $\lambda$ approximately equal to 1310 nm.

* * * * *